United States Patent
Lachapelle

(10) Patent No.: US 9,106,839 B2
(45) Date of Patent: Aug. 11, 2015

(54) AUTOMATIC LOCATION-BASED CAMERA FRAME RATE SETTINGS

(71) Applicant: Serge Lachapelle, Hallmarksvagen (SE)

(72) Inventor: Serge Lachapelle, Hallmarksvagen (SE)

(73) Assignee: GOOGLE INC., Mountain View, CA (US)

( * ) Notice: Subject to any disclaimer, the term of this patent is extended or adjusted under 35 U.S.C. 154(b) by 246 days.

(21) Appl. No.: 13/857,780

(22) Filed: Apr. 5, 2013

(65) Prior Publication Data

US 2014/0300759 A1    Oct. 9, 2014

(51) Int. Cl.
*H04N 9/73* (2006.01)
*H04N 5/235* (2006.01)
*H04N 5/228* (2006.01)

(52) U.S. Cl.
CPC .................................. *H04N 5/2357* (2013.01)

(58) Field of Classification Search
CPC ............ H04N 5/2357; H04N 5/23232; H04N 21/4223
USPC .......................... 348/207.1, 222.1, 226.1, 372
See application file for complete search history.

(56) References Cited

U.S. PATENT DOCUMENTS

| | | |
|---|---|---|
| 2002/0131491 A1 | 9/2002 | Smith et al. |
| 2003/0112343 A1 | 6/2003 | Katoh et al. |
| 2005/0237394 A1 | 10/2005 | Katiblan et al. |
| 2007/0023497 A1 | 2/2007 | Chuang et al. |
| 2011/0050951 A1* | 3/2011 | Morino ...................... 348/226.1 |
| 2011/0207505 A1 | 8/2011 | Yoon |
| 2012/0154629 A1 | 6/2012 | Horiuchi |
| 2012/0257082 A1* | 10/2012 | Kato et al. ................. 348/229.1 |

FOREIGN PATENT DOCUMENTS

| | | | | |
|---|---|---|---|---|
| JP | 2003/179805 A | | 6/2003 | |
| WO | WO 00/07363 | * | 2/2000 | ............ H04N 5/232 |
| WO | WO 2011/078682 A1 | | 6/2011 | |

* cited by examiner

*Primary Examiner* — Kelly L Jerabek
(74) *Attorney, Agent, or Firm* — Birch, Stewart, Kolasch & Birch, LLP

(57) ABSTRACT

Systems and methods for adjusting the frame rate or other settings of a video camera device operably connected to a computing device are discussed. Embodiments disclosed herein include features such as detecting a camera activation event, acquiring location information about the location of the computing device, determining an AC power frequency associated with the device location or with a power source used by the device, determining ambient lighting conditions near or around the device, identifying a camera frame rate meant to reduce or avoid flicker that would otherwise be caused by a mismatch between AC frequency and camera frame rate, and setting the frame rate of the camera to the identified rate. Embodiments may include some or all of the features noted above, as well as additional features described herein.

16 Claims, 7 Drawing Sheets

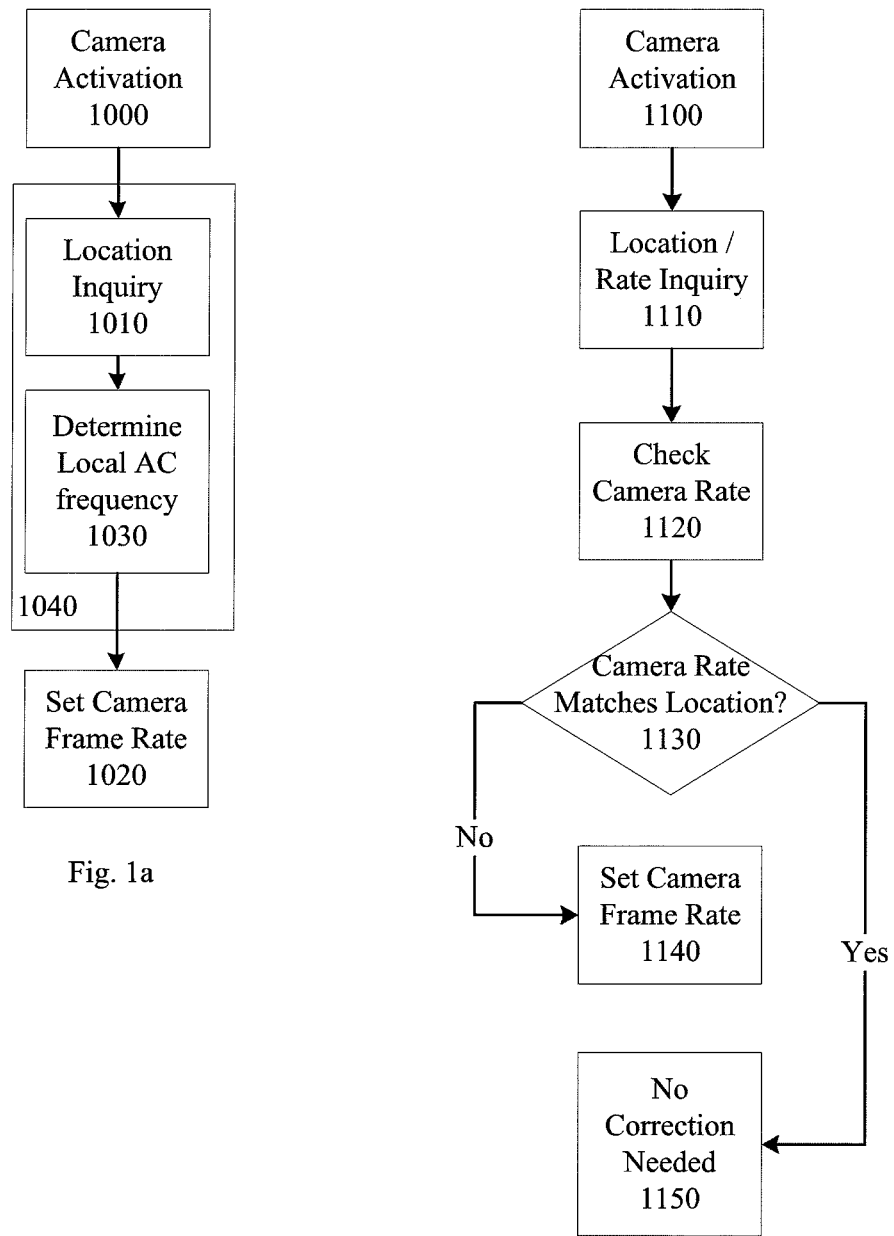

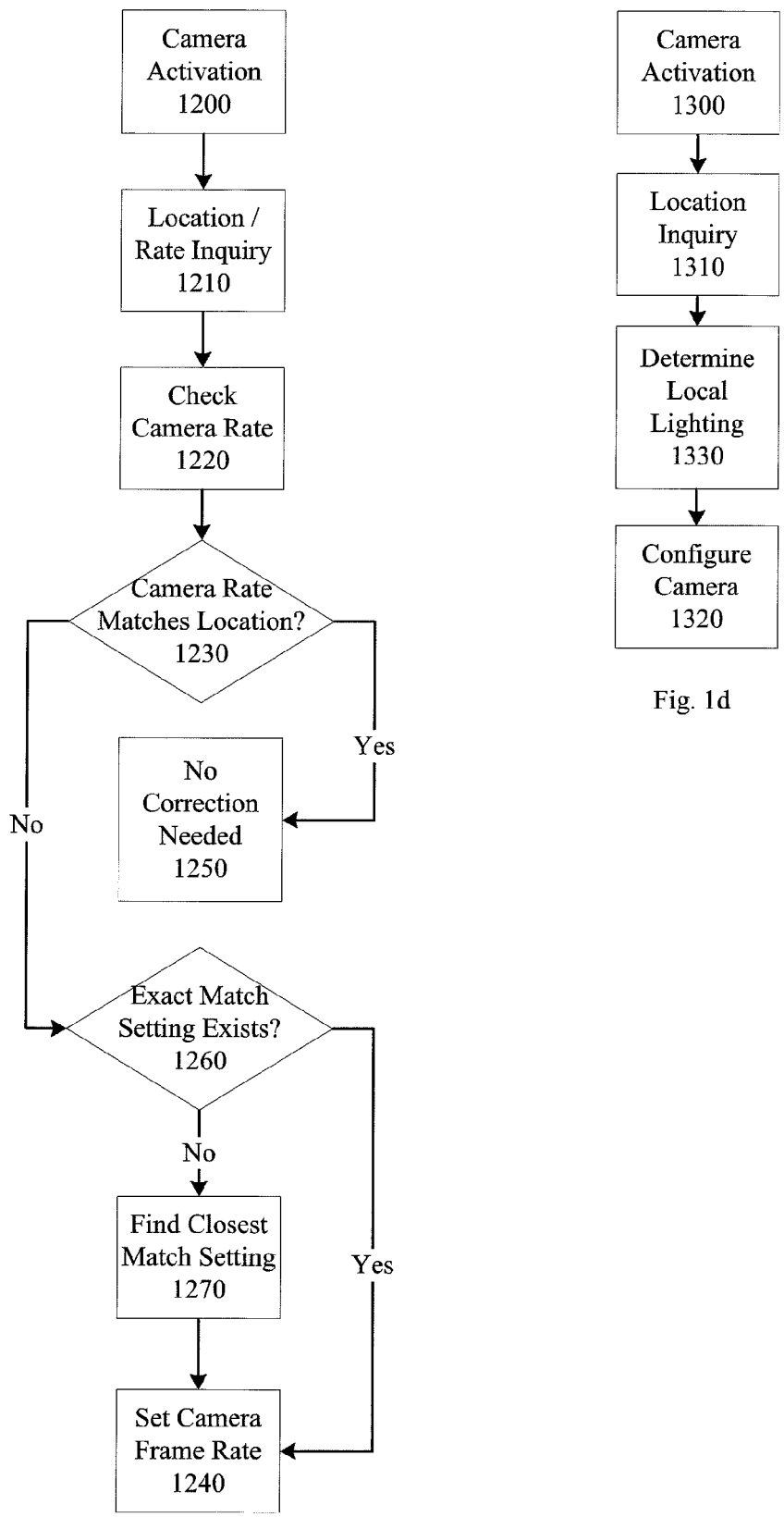

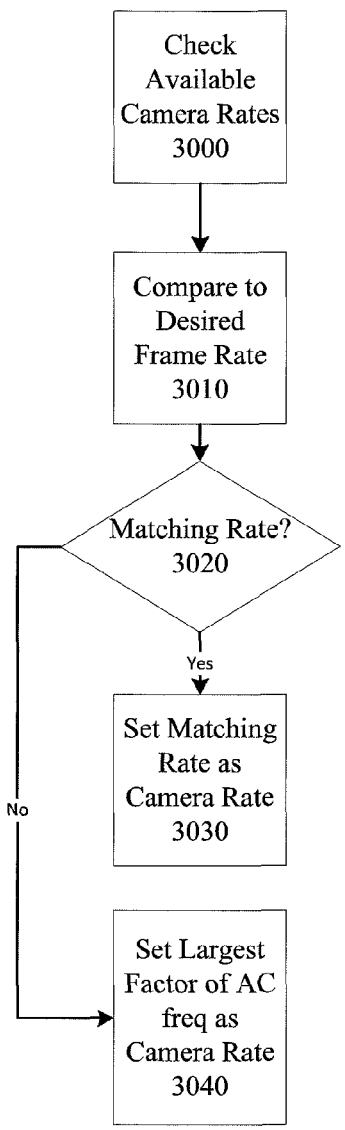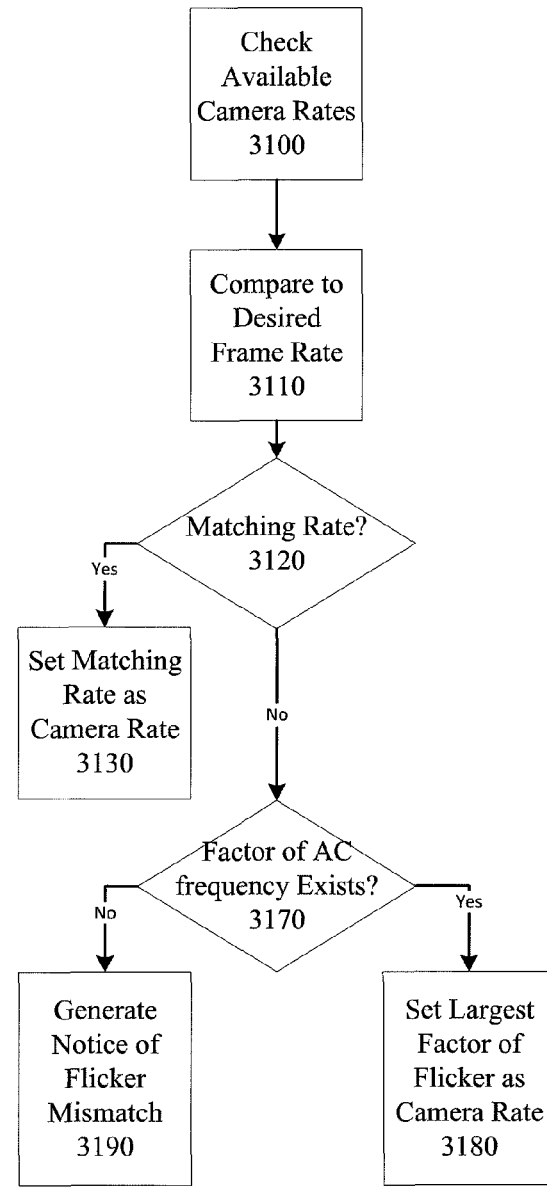
Fig. 3a
Fig. 3b

AUTOMATIC LOCATION-BASED CAMERA FRAME RATE SETTINGS

BACKGROUND

Computer and mobile phone cameras capture video images at a certain frequency. This is usually called a camera's "refresh rate" or "frame rate." Lamps and various forms of lighting can disturb image quality as they often "refresh" using the power grid frequency. In alternating-current (AC) power grids, the power has a determined frequency at which it alternates. For example, most European power grids currently cycle at 50 Hz whereas the North American power grid cycles at 60 Hz. Although not visible to the naked eye, this causes light sources such as incandescent bulbs, fluorescent lights, halogen lights, and light-emitting diodes to flash of flicker at the frequency of the power grid to which they are connected. A mismatch between the camera frame rate and the power grid frequency can cause a problem in video capture known as flickering. Flickering is undesirable visually because the illumination of the video frames becomes inconsistent, making it seem as though the video image is rapidly switching between being bright and dark. It also causes extra complexity in the video image which leads to increased network and resource usage.

For example, when a COTS (commercial off-the-shelf) web/computer camera standardized for North America is used in Europe, flickering is very noticeable as the electrical grid is synced to 50 Hz instead of North America's 60 Hz. The lighting indoors mismatches the camera's refresh rate meaning that the flickering of the lights is picked up and exacerbated by the camera.

Currently, solving this problem requires either a manual reset of the camera rate or a software solution that backs out the flickering problem using image processing software. These solutions are expensive and add delay and/or require manual intervention every time this problem occurs. Even those cameras equipped with some measure of built-in flicker compensation cannot perform this function at higher resolutions, requiring manual re-configuration of camera resolution to make use of such a feature.

SUMMARY

In view of the foregoing, the present disclosure offers an automated, configuration-based flicker solution governed by a location or environment of the camera. This avoids the need for ongoing manual intervention, specialized software, or resolution loss.

Embodiments of techniques and devices discussed herein may pertain to a method for adjusting the frame rate of a video camera device operably connected to a computing device, the method comprising: in response to a video camera activation event detected by the computing device, acquiring information about an Alternating Current (AC) power frequency associated with a location of the computing device; identifying an available frame rate setting for the video camera device based on a video camera device driver accessible to the computing device, where identifying includes calculating a frame rate setting suitable to avoid flicker for the AC power frequency of the location; and setting the frame rate of the activated video camera device to the calculated frame rate setting via the video camera device driver.

In some embodiments, the step of acquiring information includes: acquiring locale information with the computing device from a location information data source; and determining, based on the acquired location information, an Alternating Current (AC) power frequency associated with the locale information. In some embodiments, the video camera device driver includes a plurality of frame rate settings. In some embodiments, the video camera device driver includes a 30 frame-per-second setting and a 25 frame-per-second setting.

In some embodiments, the step of identifying an available frame rate includes comparing a current frame rate setting of the camera to the calculated frame rate setting; and determining, based on said comparing, whether the current frame rate setting of the camera is a frame rate setting suitable to avoid flicker for the AC power frequency of the location; and said setting including leaving the current frame rate setting of the camera un-changed in response to a determination that the current frame rate setting of the camera is a frame rate setting suitable to avoid flicker for the AC power frequency of the location.

In some embodiments, the step of identifying further comprises: comparing the calculated frame rate setting against all available frame rate settings of the video camera device driver; determining, based on said comparing, whether the video camera device driver has an available frame rate setting that matches the calculated frame rate setting; and selecting a best match frame rate setting from among the available frame rate settings of the video camera driver in response to a determination that the video camera device driver does not have an available frame rate setting that exactly matches the calculated frame rate setting, where a value of the best match frame rate setting is an arithmetic factor of the calculated frame rate setting; and said setting further comprising setting the frame rate of the activated video camera device to the selected best match frame rate instead of the calculated frame rate in response to the determination that the video camera device driver does not have an available frame rate setting that exactly matches the calculated frame rate setting.

In some embodiments, the step of setting further comprises leaving the current frame rate setting of the camera un-changed and generating an indication that the current frame rate setting could not be adjusted in response to a determination that the video camera device driver has no available frame rate setting that matches the calculated frame rate setting.

In some embodiments, the method further comprises: determining whether the video camera device driver allows for a clock or timing signal of the camera to be offset in response to a determination that the video camera device driver has no available frame rate setting that matches the calculated frame rate setting; calculating a clock or timing signal offset and applying the calculated clock or timing signal offset to the camera in response to a determination that the video camera device driver allows for a clock or timing signal of the camera to be offset; generating an indication that the current frame rate setting could not be adjusted in response to a determination that the video camera device driver does not allow for a clock or timing signal of the camera to be offset; and said setting further comprising leaving the current frame rate setting of the camera un-changed in response to the determination that the video camera device driver has no available frame rate setting that matches the calculated frame rate setting.

In some embodiments, said determining includes receiving information about an AC power frequency from a database in response to a database query based on the acquired location information, where the database includes data representing associations between AC power frequencies and locations.

In some embodiments, the location information includes information about a country where the computing device is currently located. In some embodiments, the step of acquiring information includes: acquiring information about an Alternating Current (AC) power frequency from a power supply of the computing device, said power supply being connected to a power source external to the computing device.

Embodiments of techniques and devices discussed herein may pertain to a method for adjusting the frame rate of a video camera device operably connected to a computing device, the method comprising: in response to a video camera activation event detected by the computing device, selecting a set of sample frames from among the video image frames captured by the video camera at an activation frame rate; analyzing the sample frames to determine whether flicker effects from nearby light sources are present in the image data; in response to a determination that flicker effects from nearby light sources are present in the image data, determining a flickering frequency of the nearby light sources; identifying an available frame rate setting for the video camera device based on a video camera device driver accessible to the computing device, where identifying includes calculating a frame rate setting suitable to avoid flicker at the determined flickering frequency; and setting the frame rate of the activated video camera device at the calculated frame rate.

Embodiments of techniques and devices discussed herein may pertain to a non-transitory computer-readable medium having embodied thereon instructions which, when executed by a computer, cause the computer to perform a method including on some or all of the steps in the various embodiments, and variations thereon, described above.

Further scope of applicability of the systems and methods discussed will become apparent from the detailed description given hereinafter. However, it should be understood that the detailed description and specific examples, while indicating embodiments of the systems and methods, are given by way of illustration only, since various changes and modifications within the spirit and scope of the concepts disclosed herein will become apparent to those skilled in the art from this detailed description.

BRIEF DESCRIPTION OF THE DRAWINGS

The systems and methods discussed will become more fully understood from the detailed description given herein below and the accompanying drawings that are given by way of illustration only and thus are not limitative.

FIG. 1a shows a block diagram of an embodiment of a location-based camera configuration process as described herein;

FIG. 1b shows a block diagram of an embodiment of a location-based camera configuration process as described herein;

FIG. 1c shows a block diagram of an embodiment of a location-based camera configuration process as described herein;

FIG. 1d shows a block diagram of an embodiment of a location-based camera configuration process as described herein;

FIG. 3a shows a block diagram of an embodiment of a location-based camera frame rate setting operation as described herein;

FIG. 3b shows a block diagram of an embodiment of a location-based camera frame rate setting operation as described herein;

Figure 2A:
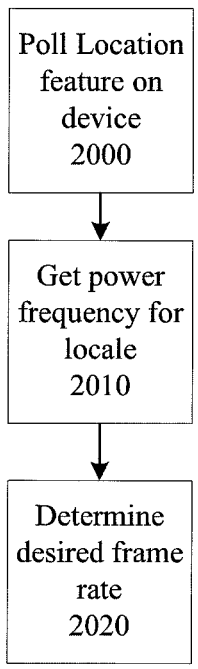
FIG. 2a shows a block diagram of an embodiment of a location-based camera frame rate determination as described herein.

The drawings will be described in detail in the course of the detailed description.

DETAILED DESCRIPTION

The following detailed description refers to the accompanying drawings. The same reference numbers in different drawings identify the same or similar elements. Also, the following detailed description does not limit the concepts discussed. Instead, the scope of the concepts discussed herein is defined by the appended claims and equivalents thereof.

For purposes of this disclosure, a camera may include part or all of a video capture device integrated into a laptop, tablet, or hand-held computing device or smart-phone or other type of computing and/or data processing and information exchange device such as a wearable or implantable device. A camera may also include part or all of a video capture device meant to operate fully or partially independently and be connected to a desktop, laptop, tablet, or hand-held computing device or smart-phone or other type of computing and/or data processing and information exchange device such as a wearable or implantable device. Such a fully or partially independent device may include a webcam and/or a digital camera device connected to the computing and/or data processing and information exchange device through either or both of a wired or wireless data connection. Although embodiments discussed below are presented in the context of a webcam controlled by a laptop computing device, the disclosed embodiments and variations thereof are applicable to all camera and computing and/or data processing and information exchange device combinations mentioned above and variations thereof.

In one embodiment, a flickering or frame rate mismatch problem may be solved by accessing a location API(s) in a browser or other device application to discover what country or locale the user is currently located. A browser may include a web browser that may be either installed on or included as part of the operating system or design of the computing device. Such an embodiment is shown in FIG. 1a.

Upon detecting or otherwise recognizing that a camera has been activated 1000, the computing device may perform a location/rate inquiry 1040 to determine the local AC frequency and/or desired camera frame rate 1040. In one variation, such an inquiry may be performed only in response to a determination that the camera has been activated for the purpose of video capture (as opposed to, for example, still image capture). In another variation, such a rate inquiry may be performed in response to any detected camera activation/access. In one variation, such an inquiry may include first determining a geographic locale for the device through an API call to a browser or application and/or, in the case of a GPS-capable device, a GPS location request 1010.

Based on the locale/country information acquired through the API, a database lookup may be performed (or an internal settings file local to or cached on the device may be referenced) to determine what the AC frequency is for the power grid of the country or locale 1030. An appropriate frame rate may then be determined and set for the camera/camera driver 1020 based on the determined AC frequency 1030. Such a setting may be accomplished by automatically changing the camera driver settings to the determined frame rate. For example, a camera driver may have available frame rates of 25 frames per second and 30 frames per second. A location inquiry indicating that the camera and/or device controlling the camera is in Italy may be associated with a 50 Hz AC frequency. In such a case, the camera driver will be set to have the 25 fps (frames per second) rate to match the 50 Hz frequency.

In some embodiments, such a frame rate check may be performed each time the camera is activated so that it has a refresh rate that always matches the AC frequency of the local power grid. In some embodiments, a device user may have the ability to activate or de-activate such an automatic refresh rate feature. In some embodiments, such an automatic refresh rate feature may be blocked or otherwise de-activated by blocking the feature's ability to access location information on/from/through the device.

Such a solution involves no complex image processing/flicker adjustment software and does not require a need to reconfigure hardware each time locales are changed. Such a solution involves no complex algorithm, no attempt to remove the flicker effect in the software using signal processing which could cost valuable CPU resources. Such a solution may be of particular benefit to video-chat applications which may otherwise require manual re-configuration before starting a chat setting or cause the video feed to be substantially delayed or otherwise effectively unusable due to the added processing overhead required for the signal processing.

In another embodiment, a database or file lookup result to determine a local AC power frequency may then be used to determine if the webcam has the appropriate refresh setting and, if not, to set the webcam's internal refresh rate such that it matches the frequency of the local power grid. Such an embodiment, shown in FIG. 1b, may provide the added benefit of minimizing settings changes and thereby further reducing the computational impact of such a feature. In the embodiment shown, upon detecting or otherwise recognizing that a camera has been activated 1100, the computing device may perform a location/rate inquiry 1110 to determine the local AC frequency and/or desired camera frame rate. The current camera frame rate may then be checked or compared 1120 against the location/rate inquiry 1110 result to determine if the camera frame rate matches or is otherwise suitable for the determined location and/or AC frequency 1130. If the camera frame rate matches or is otherwise suitable for the locale, no further action may be required 1150. If the camera frame rate is not suitable for the locale/AC frequency, an appropriate frame rate may be determined and set for the camera/camera driver 1140.

In another embodiment, a camera may not have an exact frame rate to match a local AC frequency. For example, certain industrial or offshore locales may use a 400 Hz AC frequency. A COTS camera is unlikely to have a 200 fps setting to match such an AC frequency. Such an embodiment is shown in FIG. 1c. In the embodiment shown, a location/rate inquiry 1210 may be performed in response to a camera activation event 1200. The camera frame or refresh rate 1220 may then be checked and evaluated against a desired or determined frame rate 1230 based on the locale. In some embodiments the camera frame rate matches and thus no further steps are taken 1250 as no correction is needed.

In some embodiments, a further check may be performed to determine if an exact frame rate match is available 1260. An exact frame rate match may, in some embodiments, be a frame rate that is half of the determined local AC frequency. For example, 30 fps may be an exact frame rate match for a 60 Hz AC frequency. If the camera/driver has a setting that is an exact frame rate match, that frame rate may be set/selected 1240. If, however, an exact frame rate match is not available, the closest/best match setting may need to be determined 1270. In some embodiments, the best/closest frame rate match for a determined AC frequency may be a frame rate that represents the largest factor of the determined AC frequency from among the available frame rates for the camera. For example, a COTS camera may have available frame rates of 10 fps, 15 fps, 25 fps and 30 fps. In a 400 Hz environment, the closest match setting would be 25 fps because 25 is the largest factor of 400 from among the available frame rates.

In some embodiments, aspects other than a camera frame rate may be controlled based on a location of a camera-equipped device. In some embodiments, camera or camera driver settings such as white balance may be automatically adjusted based on an inferred or expected lighting condition associated with a location of the device. A device that is determined to be located outside, for example, may not require a frame rate adjustment for expected lighting flicker because the expected lighting condition may be ambient light. However, if the device is determined to be located outside during an expected peak daylight time, a white balance adjustment may be performed automatically on the camera to compensate for bright sunlight. Such an embodiment is shown in FIG. 1d.

In the embodiment shown, upon detecting or otherwise recognizing that a camera has been activated 1300, the computing device may perform a location inquiry 1310 to determine where the camera-equipped device is located. In some embodiments, such a location inquiry may provide information about whether the device is located inside or outside an enclosed structure such as a building. A local lighting determination 1330 may then be performed to determine a known or expected lighting level given the location of the device. In one embodiment, for example, an outdoor location may be compared to time information acquired either from a network/internet inquiry or from the device itself. Smartphones, tablet devices, and other computing devices using a cellular data network, for example, may receive time and date information from a local cell tower. Such information may be accessed in conjunction with indoor/outdoor location information to determine an approximate or expected ambient light level 1330. Such a determination may then be used to configure camera or camera driver settings such as white balance 1320 automatically.

In some embodiments, a desired camera frame rate may be determined from location data extracted by a browser API or a GPS location feature or a location API that is part of a device or operating system. Such an embodiment is shown in FIG. 2a.

In the embodiment shown, a location feature on a device or application may be polled 2000 to determine a location of the device. Such a location feature may include a GPS receiver in a handheld, smart-phone, or tablet device and/or a browser or application API that can determine device location based on information such as IP address and packet/data routing. In some embodiments, location data may be further refined by additional data providing further context to the polled location. For example, a location indicating that a device is located in the middle of the Caribbean sea may be understood as actually being on a ship or an oil platform.

Once a location has been determined and, if applicable, a location context, an AC power frequency for the locale may be determined 2010. Such a determination may be accomplished by an information lookup operation to either or both of a local or network-accessible data source. In an embodiment involving a network-accessible data source, the lookup operation may be a web-based database query performed via HTTP. In another embodiment, a file or database may be stored or cached on, or in a storage device directly attached to, the device. In some such embodiments, the file or database may be a lookup table or similar reference file in which an AC power frequency may be correlated to a set of coordinates, a country, or a particular locale within a country.

In some variations, a determined locale 2000 may be resolved only to a country-level granularity. In other variations, a determined locale 2000 may be resolved to a further level of granularity, such as to a region or neighborhood. In other variations, a locale may be resolved to the highest available level of granularity, with country information preserved therein. A determination of AC power frequency for the locale may then be determined 2010 based on the determined locale at the country level or at a higher level of granularity for locales where an AC frequency may vary within country or region. A desired camera frame rate may then be determined based on the AC frequency of the locale 2020. In some embodiments, the desired frame rate may be one half of the AC frequency of the locale. In other embodiments, the desired frame rate may be constrained to certain limits, such as frame rates no less than 10 fps and no more than 60 fps, to ensure that the determined desired frame rate 2020 is not likely to exceed the capabilities of a camera. In other embodiments, the desired frame rate may be limited to the available frame rates of the camera/driver included in a device such as a smartphone.

Figure 2C:
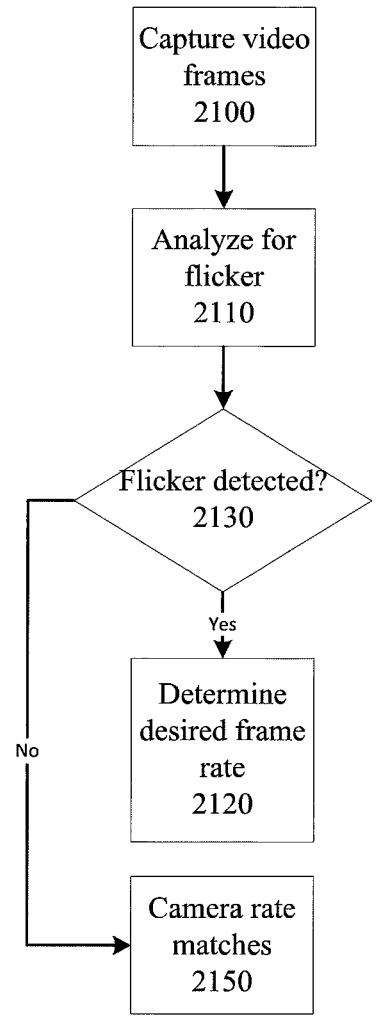
FIG. 2c shows a block diagram of an embodiment of a location-based camera frame rate determination as described herein.
Figure 2B:
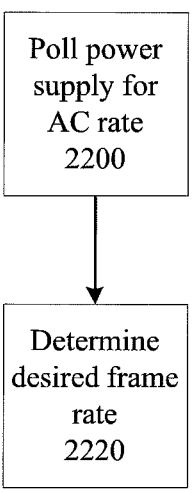
FIG. 2b shows a block diagram of an embodiment of a location-based camera frame rate determination as described herein.

In some embodiments, the AC frequency data may be provided to a device via a power supply. Such an embodiment is shown in FIG. 2b. In devices where power is provided to the device via a USB or other data-capable connection, such as with smartphones or tablets, the transformer converting the incoming AC power to a DC power output suitable for the device may also be configured to send data to the device about the cycle frequency of the incoming AC power or to generate such data in a form accessible by the device 2200. A device receiving such information via a data connection from its power supply can then utilize this information to adjust internal settings such as camera frame rates 2220 to reduce or avoid visible light flicker otherwise caused by having a sample rate that does not match the local AC frequency. Such a variation may eliminate the need for any location awareness by the device, and instead allow for camera frame rate adjustment based entirely on an AC frequency rate detected by a device transformer and/or power supply.

In other embodiments, the first several frames of captured video can be analyzed by the browser, device, an application on the device or by a browser-based/device based video-chat/video-conference tool to determine if there is flicker present as a result of sampling rate/AC frequency mismatch. The results of this initial analysis can then be used to create driver settings instructions that are passed to the video camera to adjust the appropriate settings. Such an embodiment is shown in FIG. 2c.

In such an embodiment, the first few seconds of video may be captured 2100 and analyzed 2110 to determine if there is flicker in the video signal. In some embodiments, such capturing and analysis may take all the video frames from the first two or three seconds of video and analyze them for the presence of unusually light or unusually dark video frames. In other embodiments, every second or third or nth frame from the first few or more seconds may be captured 2100 and analyzed 2110. Embodiments of such capture and analysis may include simply measuring an overall brightness, color and/or intensity level of the frame of image data and comparing that to an overall average brightness/color/intensity. Based on where in a time sequence of the video frames the unusually dark or light video frames occur and based on a current known frame rate of the camera, a likely required frame rate of the camera to compensate for regional AC frequency may be inferred.

In some embodiments, such capture and analysis may be performed entirely remotely. In one embodiment, a web-based video chat application may analyze an overall image brightness level a part of a process of relaying frames of image data between parties in a video chat. Because a person engaged in a video conference or video broadcast is unlikely to be rapidly changing their broadcast environment (e.g. running between indoors and outdoors locations or the like), analyzing a handful of video frames in a given time period (such as, for example, one frame per second) may enable an automatic determination of local lighting conditions for a webcam user and allow for an attendant automatic change in driver settings based on that determination.

In embodiments where a participant in a video chat is expected to remain in generally the same environment for the duration of their presence on the video chat, an overall or average image brightness may be computed and individual captured image frames may be analyzed by comparing them to the computed average. Individual frames having unusually low brightness as compared to the immediately preceding and following frames may be deemed as indicators of flicker. If a flicker is detected 2130 in the image stream, a frequency with which such flicker frames occur in the captured image stream may then be used to determine a desired or appropriate frame rate 2120 to eliminate the flicker. In an embodiment where such capture and analysis is performed as part of a video chat application that conveys or otherwise transmits an image data stream between parties in a video chat, a determined frame rate may then be sent back to the device producing the flickering video stream in order to change the settings of the camera/camera driver of that device.

In embodiments cases, even after determining the local AC power frequency or determining the light flicker rate, a camera cannot simply be set to match the determined frequency because the camera may not have a setting that exactly matches. For example, detected AC power/flicker may be determined at a non-standard frequency such as 55 Hz. In such cases, the webcam device may be polled or the driver(s) associated with the device may otherwise be interrogated to find available sampling rates. The available frame rates of the camera may then be correlated to or otherwise evaluated to determine the best frame rate for mitigating or otherwise removing flicker effects caused by mismatch in the camera frame rate and the AC local frequency. Such an embodiment is shown in FIG. 3a.

In the embodiment shown, once a local AC frequency and/or a desired frame rate has been determined, available camera rates for the camera associated with the device may be checked 3000 and compared to a desired or required frame rate 3010 that will compensate for the flicker. If the camera or camera driver has an available frame rate that matches the desired frame rate 3020, the camera/driver is set to have the matching frame rate 3030. If the camera or camera driver does not have an available frame rate that matches the desired frame rate 3020, the camera/driver is set with a frame rate that is the largest factor of the local AC frequency 3040.

In some embodiments, however, there may not be a suitable frame rate that can be set. Such an embodiment is shown in FIG. 3*b*. In the embodiment shown, once a local AC frequency and/or a desired frame rate has been determined, available camera rates for the camera associated with the device may be checked 3100 and compared to a desired or required frame rate 3110 that will compensate for the flicker. If the camera or camera driver has an available frame rate that matches the desired frame rate 3120, the camera/driver is set to have the matching frame rate 3130. In the embodiment shown, if the camera or camera driver does not have an available frame rate that matches the desired frame rate 3120, a check is performed to see if the camera or camera driver has an available frame rate that is a factor of the AC frequency 3170. If such a frame rate is available, the camera or camera driver is set to have this frame rate 3180. However, if such a frame rate is not available, an error message or other indicator may be generated 3190 to inform a device user that the automatic camera frame rate adjustment feature was not able to set an appropriate camera frame rate to compensate for ongoing or expected flicker in the video stream.

Figure 3C:
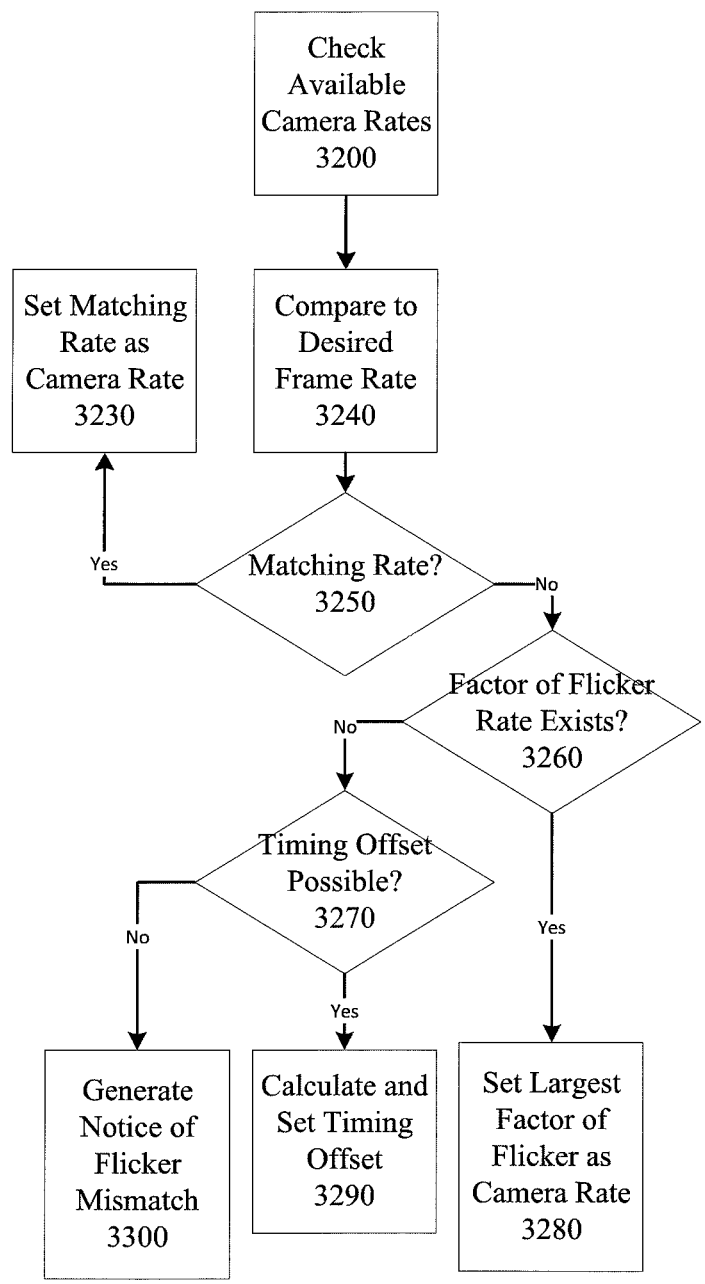
FIG. 3c shows a block diagram of an embodiment of a location-based camera frame rate setting operation as described herein.

In some embodiments, the clock signal of the camera or the device may be offset. Such clock signal modification may be an effective or possible technique in situations where an appropriate sample rate is not available. In such situations, a clock signal offset may help prevent any individual frame of the image signal from capturing the peak or trough of a light flicker event, making the sequence of captured images seem more evenly lit even in cases where there is still a mismatch between the camera sampling rate and the local AC frequency. Such an embodiment is shown in FIG. 3*c*.

In the embodiment shown, once a local AC frequency and/or a desired frame rate has been determined, available camera rates for the camera associated with the device may be checked 3200 and compared to a desired or required frame rate 3240 that will compensate for the flicker. If the camera or camera driver has an available frame rate that matches the desired frame rate 3250, the camera/driver is set to have the matching frame rate 3230. In the embodiment shown, if the camera or camera driver does not have an available frame rate that matches the desired frame rate 3250, a check is performed to see if the camera or camera driver has an available frame rate that is a factor of the AC frequency 3260. If such a frame rate is available, the camera or camera driver is set to have this frame rate 3280. However, if such a frame rate is not available, a further check may be performed to see if the camera or camera driver allows for clock signal modification. If the clock signal of the camera or camera driver can be modified, a preferred timing and/or signal offset may be calculated and set to help prevent any individual frame of the image signal from capturing the peak or trough of a light flicker event 3290. However, if neither a frame rate nor clock signal adjustment is possible, an error message or other indicator may be generated 3300 to inform a device user that the automatic camera frame rate adjustment feature was not able to set an appropriate camera frame rate or take other steps to compensate for ongoing or expected flicker in the video stream.

Figure 4A:
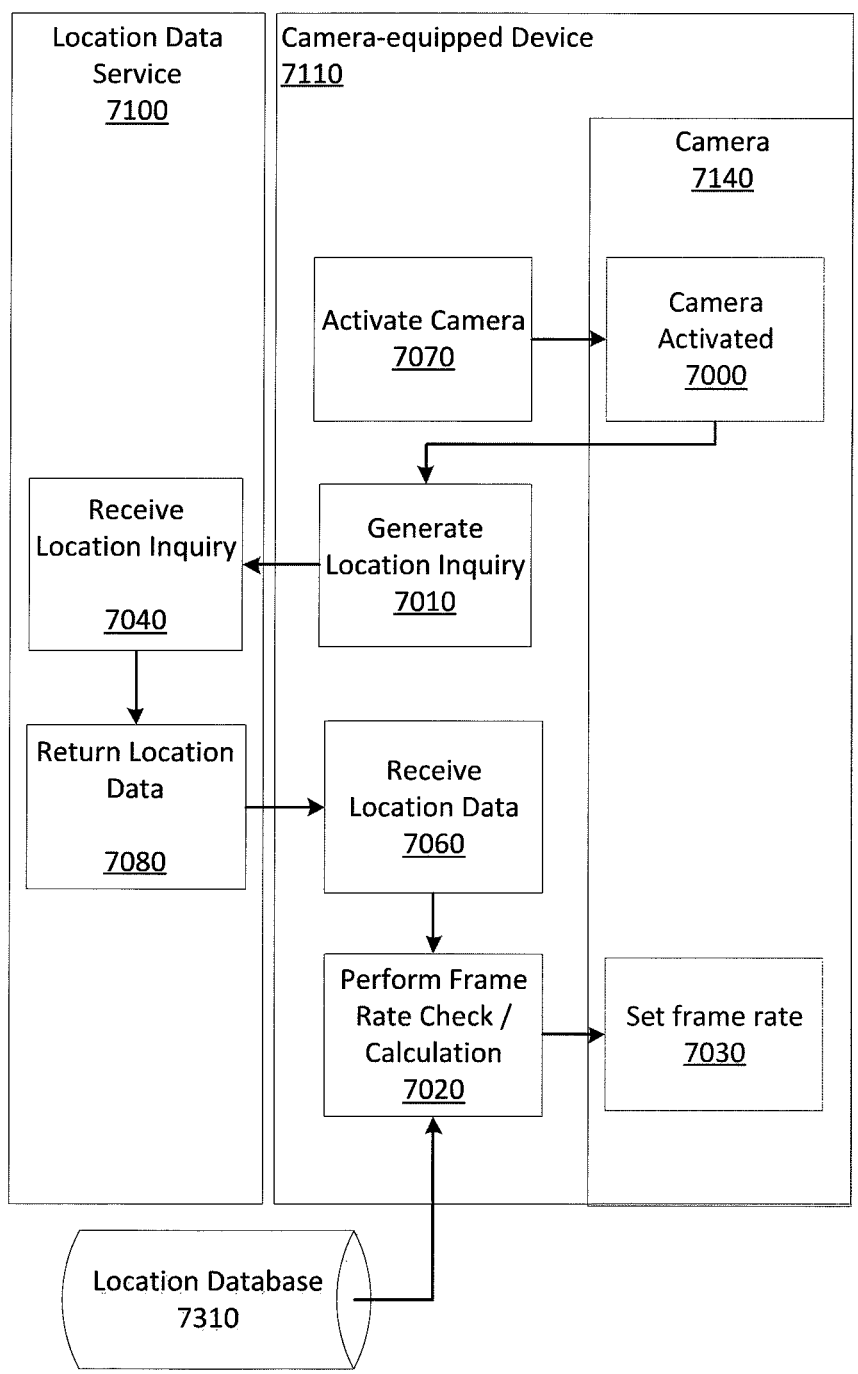
FIG. 4a shows a block diagram of an embodiment of a location-based camera configuration process as described herein.

FIG. 4*a* is a block diagram illustrating an example computing device equipped with a camera and showing an embodiment of a location-based camera frame rate adjustment. In the embodiment shown, the camera-equipped device 7110, which may be a smartphone or tablet or a computer equipped with an integrated or externally-connected camera, directs or otherwise indicates that the camera should be activated 7070. This may be part of or included in activation or access of a video chat application or a video capture application or feature either on the device or accessed via a browser such as in internet browser.

The camera 7140 activates 7000 in response to the activation direction 7070 from the device 7110. The camera may be an integrated camera in a smartphone, tablet, or laptop or desktop computer, or may be a camera such as a webcam that is externally connected to a smartphone, tablet, laptop, or desktop computer.

In response to the camera activation 7000, the device 7110 may generate a location inquiry 7010 according to one or more of the embodiments described above. In the embodiment shown, the location inquiry 7010 may be a browser-based, cellular-based, or GPS based inquiry to a location data service 7100 that is external to the device. In the case of a browser-based location inquiry 7010, the location data service may be based on a lookup of an IP address associated with the device and/or a routing path from a known location to the device. The location data service 7100 may receive the location inquiry 7040 from the device 7110 and return location data 7080 to the device 7110. The location data may include location data of varying levels of granularity. The location data may include a set of coordinates based on an estimated latitude and longitude of the device within a particular error range. The location data may include a country where the device is located based on an IP address and/or routing path associated with the device. The location data may include position information based on a known location of a cellular antenna or access point near the device. In some embodiments, the location data may include some or all of the above types of location information as well as other information such as approximate street address or even particular position within (or outside of) a building.

The device 7110 may receive the location data 7060 and use the received location data to perform a check and/or calculation of an appropriate or preferred frame rate 7020 for the camera. Such a check and/or calculation of an appropriate of preferred frame rate 7020 may be performed according to some or all of the embodiments described above. In the embodiment shown, the frame rate check/calculation 7020 is performed by looking up an AC power frequency associated with the received location data 7060. A lookup of such AC power frequency data may be performed according to some or all of the embodiments described above. In the embodiment shown, the lookup is performed by accessing an external database 7310 that has location and AC frequency data correlated therein. The external database may be accessed via the interne or other network communication system. In some embodiments, the external database may be included in the location data service 7100. In such embodiments, the AC power frequency of a location may be returned as part of the received location data 7060, making a subsequent database lookup operation un-necessary.

After the check and/or calculation of an appropriate or preferred frame rate 7020 is performed, the camera 7140 may receive this frame rate information in the form of a command to the camera driver or other camera configuration to set a new frame rate 7030 (and/or to alter the camera clock signal). Such a frame rate setting may be performed according to some or all of the embodiments described above. In the embodiment shown, a frame rate is set for the camera 7030 via the camera driver (not shown) based on an outcome of the check/calculation 7020.

Figure 4B:
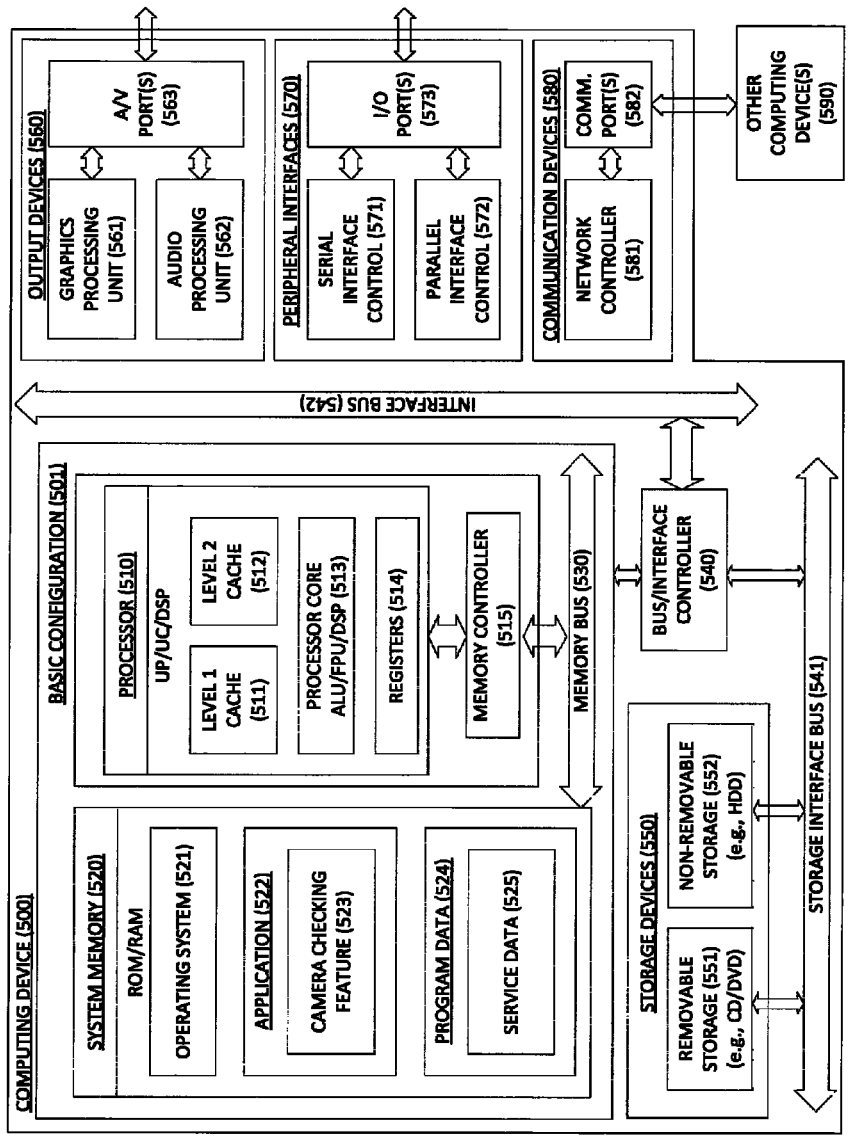
FIG. 4b shows an embodiment of a computing system configured to operate part or all of a location-based camera configuration process as described herein.

FIG. 4*b* is a block diagram illustrating an example computing device 500 that is arranged to perform automatic camera frame rate adjustment as described herein. In a very basic configuration 501, computing device 500 typically includes one or more processors 510 and system memory 520. A memory bus 530 can be used for communicating between the processor 510 and the system memory 520.

Depending on the desired configuration, processor 510 can be of any type including but not limited to a microprocessor (µP), a microcontroller (µC), a digital signal processor (DSP), or any combination thereof. Processor 510 can include one more levels of caching, such as a level one cache 511 and a level two cache 512, a processor core 513, and registers 514. The processor core 513 can include an arithmetic logic unit (ALU), a floating point unit (FPU), a digital signal processing core (DSP Core), or any combination thereof. A memory controller 515 can also be used with the processor 510, or in some implementations the memory controller 515 can be an internal part of the processor 510.

Depending on the desired configuration, the system memory 520 can be of any type including but not limited to volatile memory (such as RAM), non-volatile memory (such as ROM, flash memory, etc.) or any combination thereof. System memory 520 typically includes an operating system 521, one or more applications 522, and program data 524. Application 522 may include a camera checking/camera driver control feature 523 that is arranged to perform automatic adjustment of camera frame rate and/or other camera settings as discussed herein. Program Data 524 includes location data such as a mapping of AC frequencies to particular locales 525 that is useful for performing the desired/preferred frame rate calculations as described above. In some embodiments, application 522 can be arranged to operate with program data 524 on an operating system 521 such that the overall system performs one or more specific variations of dependency testing techniques as discussed herein. This described basic configuration is illustrated in FIG. 4 by those components within line 501.

Computing device 500 can have additional features or functionality, and additional interfaces to facilitate communications between the basic configuration 501 and any required devices and interfaces. For example, a bus/interface controller 540 can be used to facilitate communications between the basic configuration 501 and one or more data storage devices 550 via a storage interface bus 541. The data storage devices 550 can be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media can be part of device 500.

Computing device 500 can also include an interface bus 542 for facilitating communication from various interface devices (e.g., output interfaces, peripheral interfaces, and communication interfaces) to the basic configuration 501 via the bus/interface controller 540. Example output devices 560 include a graphics processing unit 561 and an audio processing unit 562, which can be configured to communicate to various external devices such as a display or speakers via one or more A/V ports 563. Example peripheral interfaces 570 include a serial interface controller 571 or a parallel interface controller 572, which can be configured to communicate with external devices such as input devices (e.g., keyboard, mouse, pen, voice input device, camera, touch input device, etc.) or other peripheral devices (e.g., printer, scanner, etc.) via one or more I/O ports 573. An example communication device 580 includes a network controller 581, which can be arranged to facilitate communications with one or more other computing devices 590 over a network communication via one or more communication ports 582.

The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 500 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 can also be implemented as a personal computer including both laptop computer and non-laptop computer configurations.

In some cases, little distinction remains between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Only exemplary embodiments of the systems and solutions discussed herein are shown and described in the present disclosure. It is to be understood that the systems and solutions discussed herein are capable of use in various other combinations and environments and are capable of changes or modifications within the scope of the concepts as expressed herein. Some variations may be embodied in combinations of hardware, firmware, and/or software. Some variations may be embodied at least in part on computer-readable storage media such as memory chips, hard drives, flash memory, optical storage media, or as fully or partially compiled programs suitable for transmission to/download by/installation on various hardware devices and/or combinations/collections of hardware devices. Such variations are not to be regarded as departure from the spirit and scope of the systems and solutions discussed herein, and all such modifications as would be obvious to one skilled in the art are intended to be included within the scope of the following claims:

The invention claimed is:

1. A method for adjusting the frame rate of a video camera device operably connected to a computing device, the method comprising:
    in response to a video camera activation event detected by the computing device, acquiring information about an Alternating Current (AC) power frequency associated with a location of the computing device;
    calculating a frame rate setting suitable to avoid flicker for the AC power frequency of the location;
    comparing the calculated frame rate setting against all available frame rate settings of the video camera device driver;
    determining, based on said comparing, the video camera device driver has an available frame rate setting that matches the calculated frame rate setting;
    in response to a determination that the current frame rate setting of the camera matches the calculated frame rate setting, leaving the current frame rate setting of the camera un-changed; and
    in response to a determination that the video camera device driver does not have an available frame rate setting that exactly matches the calculated frame rate setting,
        selecting a best match frame rate setting from among the available frame rate settings of the video camera driver, where a value of the best match frame rate setting is an arithmetic factor of the calculated frame rate setting, and
        setting the frame rate of the activated video camera device to the selected best match frame rate setting via the video camera device.

2. The method of claim 1 acquiring information including;
    acquiring locale information with the computing device from a location information data source; and
    determining, based on the acquired location information, an Alternating Current (AC) power frequency associated with the locale information.

3. The method of claim 2, said determining including receiving information about an AC power frequency from a database in response to a database query based on the acquired location information, where the database includes data representing associations between AC power frequencies and locations.

4. The method of claim 2, where the location information includes information about a country where the computing devices is currently located.

5. The method of claim 1, where the video camera device driver includes a plurality of frame rate settings.

6. The method of claim 3, where the video camera device driver includes a 30 frame-per-second setting and a 25 frame-per-second setting.

7. The method of claim 1, said setting further comprising leaving the current frame rate setting of the camera un-changed and generating an indication that the current frame rate setting could not be adjusted in response to a determination that the video camera device driver has no available frame rate setting that matches the calculated frame rate setting.

8. The method of claim 1, the method further comprising:
  determining whether the video camera device driver allows for a clock or timing signal of the camera to be offset in response to a determination that the video camera device driver has no available frame rate setting that matches the calculated frame rate setting;
  calculating a clock or timing signal offset and applying the calculated clock or timing signal offset to the camera in response to a determination that the video camera device driver allows for a clock or timing signal of the camera to be offset;
  generating an indication that the current frame rate setting could not he adjusted in response to a determination that the video camera device driver does not allow for a clock or timing signal or the camera to be offset; and
  said setting further comprising leaving the current frame rate setting of the camera un-changed in response to the determination that the video camera device driver has no available frame rate setting that matches the calculated frame rate setting.

9. The method of claim 1, acquiring information including:
  acquiring information about an Alternating Current (AC) power frequency from a power supply of the computing device, said power supply being connected to a power source external no the computing device.

10. A method for adjusting the frame rate of a video camera device operably connected to a computing device, the method comprising:
  in response to a video camera activation event detected by the computing device, selecting a set of sample frames from among the video image frames captured by the video camera at an activation frame rate;
  analyzing the sample flames to determine whether flicker effects from nearby light sources are present in the image data;
  in response to a determination that flicker effects from nearby light sources are present in he image data, determining a flickering frequency of the nearby light sources;
  calculating a frame rate setting suitable to avoid flicker at the determined flickering frequency;
  comparing the calculated frame rate setting against all available frame rate setting of the video camera device driver;
  determining, based on said comparing, where the video camera device driver has an available frame rate setting that matches the calculated frame rate setting;
  in response to a determination that the current frame rate setting of the camera matches the calculated frame rate setting, leaving the current frame rate setting of the camera un-changed; and
  in response to a determination that the video camera device driver does not have an available frame rate setting that exactly matches the calculated frame rate setting,
    selecting a best match frame rate setting from among the available frame rate setting of the video camera driver, where a value of the best match frame rate setting is an arithmetic factor of the calculated frame rate setting, and
    setting the frame rate of the activated video camera device at the selected best match frame rate.

11. A non-transitory computer-readable medium having embodied thereon instructions which, when executed by a computer, cause the computer to perform a method for adjusting the frame rate of a video camera device operably connected to a computing device, the method comprising:
  in response to a video camera activation event detected by the computing device, acquiring information about an Alternating Current (AC) power frequency associated with a location of the computing device;
  calculating a frame rate setting suitable to avoid flicker for the AC power frequency of the location;
  comparing the calculated frame rate setting against all available frame rate setting of the video camera device driver;
  determining, based on said comparing, the video camera device driver has an available frame rate setting that matches the calculated frame rate setting;
  in response to a determination that the current frame rate setting of the camera matches the calculated frame rate setting, leaving the current frame rate setting of the camera un-changed; and
  in response to a determination that the video camera device driver does not have an available frame rate setting that exactly matches the calculated frame rate setting,
    selecting a best match frame rate setting from among the available frame rate settings of the video camera driver, where a value of the best match frame rate setting is an arithmetic factor of the calculated frame rate setting, and
    setting the frame rate of the activated video camera device to the selected best match frame rate setting via the video camera device driver.

12. The medium of claim 11, acquiring information including:
  acquiring locale information with the computing device from a location information data source; and
  determining, based on the acquired location information, an Alternating Current (AC) power frequency associated with the locale information.

13. The medium of claim 11, where the video camera device driver includes a plurality of frame rate settings.

14. The medium of claim 13, where the video camera device driver includes a 30 frame-per-second setting and a 25 frame-per-second setting.

15. The medium of claim 11, said setting further comprising leaving the current frame rate setting of the camera un-changed and generating an indication that the current frame rate setting could not be adjusted in response to a determination that the video camera device driver has no available frame rate setting that matches the calculated frame rate setting.

16. The medium of claim 11, acquiring information including:
  acquiring information about an Alternating Current (AC) power frequency from a power supply of the computing device, said power supply being connected to a power source external to the computing device.

* * * * *